United States Patent [19]

Tackett

[11] Patent Number: 5,133,408
[45] Date of Patent: Jul. 28, 1992

[54] RATE CONTROLLABLE GEL FOR CONFORMANCE IMPROVEMENT TREATMENT IN A SUBTERRANEAN HYDROCARBON-BEARING FORMATION

[75] Inventor: James E. Tackett, Littleton, Colo.

[73] Assignee: Marathon Oil Company, Findlay, Ohio

[21] Appl. No.: 708,538

[22] Filed: May 31, 1991

[51] Int. Cl.$^5$ .................. E21B 33/138; E21B 43/22
[52] U.S. Cl. .................. 166/270; 166/274; 166/295; 166/300; 252/8.551
[58] Field of Search .............. 166/270, 273, 274, 294, 166/295, 300, 305.1; 252/8.551; 523/130

[56] References Cited

U.S. PATENT DOCUMENTS

| | | |
|---|---|---|
| 4,367,297 | 1/1983 | Hübner et al. |
| 4,683,949 | 8/1987 | Sydansk et al. ............ 166/270 |
| 4,702,844 | 10/1987 | Flesher et al. |
| 4,712,617 | 12/1987 | Kocsis .................. 166/295 X |
| 4,744,418 | 5/1988 | Sydansk .................. 166/270 |
| 4,766,959 | 8/1988 | Allison |
| 4,834,182 | 5/1989 | Shu .................. 166/295 |
| 4,844,168 | 7/1989 | Sydansk .................. 166/270 |

OTHER PUBLICATIONS

Nicoli, David. "Chemical Modification of Acrylamide Gels: Verification of the Role of Ionization in Phase Transitions". American Chemical Society, 1983. pp. 887-890.

Primary Examiner—George A. Suchfield
Attorney, Agent, or Firm—Jack L. Hummel; Jack E. Ebel

[57] ABSTRACT

A conformance improvement treatment process is provided for reducing the permeability of a higher-permeability zone in a subterranean hydrocarbon-bearing formation which is in fluid communication with a lower-permeability zone of the formation. The process includes preparing a gel precursor solution at the surface, injecting the solution into a wellbore penetrating the formation, placing the solution in the higher-permeability zone and gelling the solution therein. In situ gelation of the solution results in substantial permeability reduction to the higher-permeability zone. A specific gel precursor solution is utilized which contains a gelling agent and a polymer formed from at least two distinct monomers wherein the first monomer has a relatively faster, yet controlled, rate of hydrolysis and the second monomer has a relatively slower rate of hydrolysis. Gelation of the solution is delayed until a substantial number of carboxylate groups are formed in situ on the polymer. The gelling agent subsequently reacts with the carboxylate groups to effect gelation of the solution.

19 Claims, 4 Drawing Sheets

RATE CONTROLLABLE GEL FOR CONFORMANCE IMPROVEMENT TREATMENT IN A SUBTERRANEAN HYDROCARBON-BEARING FORMATION

BACKGROUND OF THE INVENTION

1. Technical Field

The present invention relates generally to hydrocarbon recovery. More particularly, the present invention relates to a process for improving conformance in a subterranean formation from which hydrocarbons are to be recovered. The present invention particularly, though not exclusively, relates to a process utilizing a crosslinked polymer gel to improve conformance in a subterranean formation from which hydrocarbons are to be recovered.

2. Description of Related Art

The injection of displacement fluids into subterranean hydrocarbon-bearing formations to promote the production of hydrocarbons therefrom is well known. Water and various gases, in addition to more complex fluids, such as surfactant solutions and polymer solutions, are common displacement fluids utilized in both miscible and immiscible oil displacement floods.

The effectiveness of oil displacement floods is reduced by conformance problems in the formation. Conformance problems are generally characterized by the juxtaposition of high permeability and low permeability flow paths within a given formation. Conformance problems can be either fracture-type or matrix-type. Fracture-type conformance problems occur when there are simple fractures or fracture networks in communication with an injection and/or production well penetrating the formation. Matrix-type conformance problems occur when there are adjoining strata or regions of differing permeability within the formation.

When a displacement fluid is injected into a formation exhibiting conformance problems, the high permeability flow paths divert substantially all of the displacement fluid away from the low permeability flow paths. As a consequence, the displacement fluid does not sweep the low permeability flow paths and the sweep efficiency of the displacement fluid in the formation is poor.

Conformance problems can be corrected by a conformance improvement treatment (CIT) which effectively plugs or constricts the high permeability flow paths with a plugging material. By plugging or constricting formation flow paths having high permeability and low oil saturation, subsequently injected displacement fluid preferentially sweeps formation flow paths having low permeability and high oil saturation. Thus, the CIT improves the sweep efficiency of the displacement fluid, enables it to contact and displace more oil, and promotes increased incremental oil recovery.

At present, gels are commonly used as a CIT plugging material. Polyacrylamide crosslinked with chromium (III) has been found to form gels which are effective for most CIT's as set forth in U.S. Pat. No. 4,683,949 to Sydansk et al. U.S. Pat. No. 4,683,949 describes the effective use of crosslinked acrylamide gels specifically made for treatment of fracture-type and matrix-type conformance problems. It has, however, been found that in some cases conventional gels employed in CIT's are ineffective for their intended purpose because in situ gelation rates of the polymers cannot be satisfactorily controlled.

In particular, although acrylamide polymers have been found to produce satisfactory gels for CIT's, under certain formation conditions such as low temperatures partially hydrolyzed polyacrylamides with more than about 1% of the amide groups prehydrolyzed to carboxylate groups have been found to gel too rapidly using a trivalent chromium crosslinking agent. Conversely, unhydrolyzed polyacrylamides with less than about 0.1% of the amide groups prehydrolyzed to carboxylate groups have been found to gel too slowly using trivalent chromium because very little in situ amide hydrolysis occurs at low temperatures. Adjustment of the polyacrylamide carboxylate concentration to a range between about 0.1 to about 1% appears to be ideal for low temperature applications, but in practice it is extremely difficult to obtain and subsequently maintain polymers within this carboxylate concentration range. Furthermore, the strength of mature gels resulting from such polymers is often too weak for the desired hydrocarbon recovery application.

It is apparent that the initial polymer carboxylate concentration is not a suitable variable under low temperature conditions for controlling the gelation rate of a gelation system. Modification of the gelling agent is often used as an alternative means to control gelation rate, but this can also have undesirable consequences on the gelation system which are not foreseeable. Accordingly, it is more desirable to achieve gelation rate control by adjusting other less sensitive gelation parameters.

Thus, a CIT is needed utilizing a gelation system which gels in situ at a relatively rapid yet controlled rate enabling adequate placement of the gel in the treatment zone. Further, a CIT is needed which enables relatively simple adjustment of the gelation system to effect corresponding corrections in the gelation rate without deleteriously altering the overall performance of the gelation system and the gel resulting therefrom.

SUMMARY OF INVENTION

The present invention is a conformance improvement treatment process for reducing the permeability of a higher-permeability zone in a subterranean hydrocarbon-bearing formation which is in fluid communication with a lower-permeability zone of the formation. The process utilizes a gel precursor solution as the gelation system. The process comprises preparing the gel precursor solution at the surface, injecting the solution into a wellbore penetrating the formation, placing the solution in the higher-permeability zone and gelling the solution therein. In situ gelation of the solution results in substantial permeability reduction to the higher-permeability zone.

The process provides for surface admixing of the components of the gel precursor solution and injection of the resulting solution into the formation as a homogeneous slug. The process further provides for delayed gelation of the solution until it is placed in the higher-permeability zone and enables controlled in situ gelation thereafter without requiring intervention by the surface operator. These features are achieved by means of a specific gel precursor solution comprising a polymer, a gelling agent, and a liquid solvent. The polymer is formed from at least two distinct monomers wherein the first monomer has a relatively faster, yet controlled, rate of hydrolysis to form carboxylate groups on the polymer in situ and the second monomer has a relatively slower rate of hydrolysis. The gelling agent is a species for crosslinking the carboxylate groups of the first monomer which are generated as a result of in situ hydrolysis. Gelation of the solution is delayed until a substantial number of carboxylate groups are formed in situ on the polymer. Upon the presence of carboxylate groups, the gelling agent is able to react with the polymer to effect gelation of the solution.

It has been found that the gelation time is a strong function of the in situ hydrolysis reaction rate of the first monomer. The first monomer hydrolysis rate can be controlled in an orderly fashion by proper selection of the concentration and type of monomer as well as the pH of the reaction solution to enable significant formation of carboxylate crosslinking sites only after a sufficient length of time has elapsed to allow the surface operator to place the solution in the higher-permeability zone. Once the first monomer has sufficiently hydrolyzed in situ, the gelling agent crosslinks the hydrolyzed monomer of adjacent or the same polymer molecule relatively rapidly to gel the solution.

The present process is particularly applicable to the treatment of formations which have a relatively low temperature, i.e., less than about 80° C. At this temperature, gelation which relies on a carboxylate crosslinking mechanism is difficult to control because gel precursor solutions containing conventional "prehydrolyzed" polymer molecules having more than about 1% polymer carboxylate groups gel too fast to enable satisfactory placement of the gel in subterranean hydrocarbon-bearing formations and conventional unhydrolyzed polymers having less than about 0.1% polymer carboxylate groups gel too slow for practical utility. Furthermore, using a polymer having between about 1% and about 0.1% polymer carboxylate groups typically results in a gel with insufficient strength for most hydrocarbon recovery applications. Accordingly, the present invention satisfies the need for a crosslinkable polymer solution which can be readily placed in a low temperature formation with a minimum of operator intervention for controlled in situ gelation of the solution.

Hydrocarbon recovery operations are benefitted in formations having undergone the present conformance improvement treatment process because subsequently injected hydrocarbon displacement fluids are diverted from the treated higher-permeability zones where little of the hydrocarbons reside to the lower-permeability zones where the bulk of the hydrocarbons reside. Thus, the process facilitates the effectiveness of subsequently injected hydrocarbon displacement fluids and ultimately increases or stabilizes hydrocarbon production from the formation or alternatively reduces water production from the formation.

The novel features of this invention, as well as the invention itself, will be best understood from the accompanying description, taken in conjunction with the accompanying drawings, in which:

DESCRIPTION OF PREFERRED EMBODIMENTS

Figure 1:
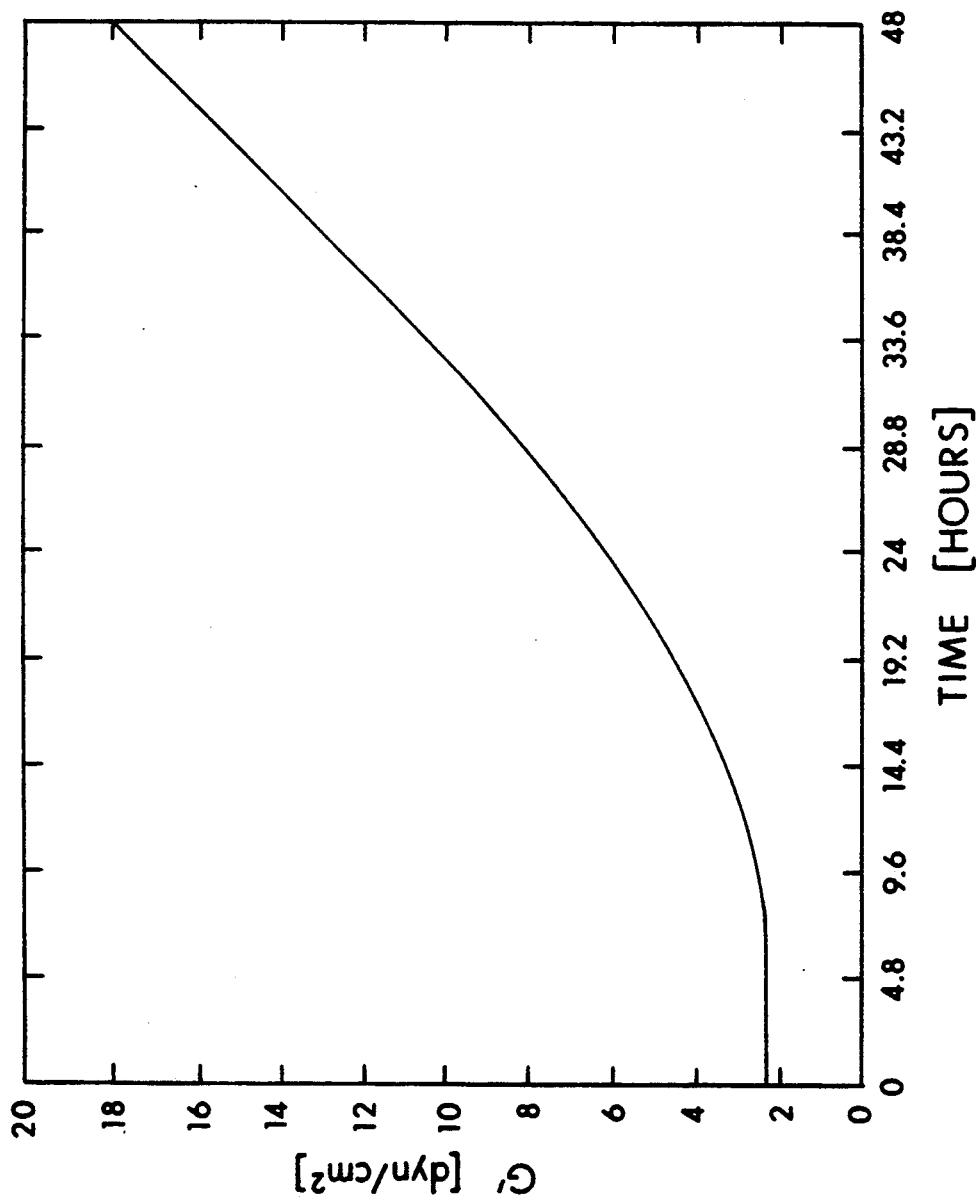
FIG. 1 is a graphical representation of the gelation process of the present invention as described in example 1.

The present invention is a process for treating a subterranean hydrocarbon-bearing formation having a zone of relatively higher permeability and a zone of relatively lower permeability in fluid communication with one another to decrease the permeability of the relatively higher-permeability zone and thereby substantially improve conformance within the formation. The treatment medium is a crosslinked polymer gel formed from a gel precursor solution containing a crosslinkable polymer and a gelling agent. The process comprises preparing the gel precursor solution at the surface, injecting the solution into a wellbore penetrating the formation, placing the solution in the zone of relatively higher permeability and gelling the solution therein.

The term "gel" as used herein is directed to a continuous three-dimensional crosslinked polymeric network integrating a liquid into the interstices of the network. The crosslinked polymeric network provides the gel structure. Depending on their degree of structure, gels can have a broad spectrum of properties, ranging from flowing gels which are slightly more viscous than water and readily flow under the force of gravity when unconfined at ambient atmospheric conditions to nonflowing gels which are very rigid under these same conditions. In any case, gels are characterized as having an increased storage modulus $G'$ relative to their precursor solutions which is attributable to crosslinking, or gelling as it is alternatively termed, of the polymer. The gelling agent is a crosslinking agent defined herein as a species which effects chemical crosslinks between crosslinking sites on the same or different polymer molecules.

The polymer employed in the gel precursor solution is formed from at least two distinct monomers, such as a copolymer or a terpolymer, wherein the first monomer has a relatively faster, yet controlled, rate of hydrolysis to form polymer carboxylate groups and the second monomer has a relatively slower rate of hydrolysis at the formation conditions. Contemplated within the scope of monomers having a relatively slower rate of hydrolysis are those monomers which undergo a slow hydrolysis reaction as well as those which undergo no hydrolysis reaction at all under the formation conditions. The term "monomer" is used herein to refer to the discrete singular molecular building blocks from which the polymer is synthesized as well as to the distinctly identifiable groups integral within the molecular chain of the polymer which result from synthesis of these singular building blocks.

A preferred polymer is a copolymer having a hydrolyzable ester as the first monomer and acrylamide as the second monomer. A preferred hydrolyzable ester is selected from the group of water-soluble esters including short chain alkyl acrylates or ethoxy substituted alkyl acrylates. Most preferred esters include methyl, ethyl, ethoxy methyl, ethoxy ethyl, ethoxy ethoxy methyl or ethoxy ethoxy ethyl acrylates. Short chain alkyl groups are those having less than 4 carbons unless a substituted hydrophilic group is present on the chain, in which case more carbons are possible so long as the ester remains water soluble. Other possible second monomers in addition to acrylamide, though less preferred, include N-substituted acrylamides which maintain water solubility. The ratio of first monomer to second monomer in the polymer molecule is between about 20:80 and 1:99, and preferably between about 10:90 and 3:97.

The crosslinking agent of the present invention is preferably a molecule or complex reactive with carboxylate groups and containing a transition metal cation. A most preferred crosslinking agent comprises a trivalent chromium cation complexed or bonded to an anion, atomic oxygen or water. Exemplary crosslinking agents are chromic triacetate ($CrAc_3$) and chromic trichloride ($CrCl_3$). Other transition metal cations which are found in crosslinking agents having utility in the present invention, although less preferred, are chromium (VI) within a redox system, aluminum (III), iron (II), iron (III) and zirconium (IV).

The gel precursor solution further contains a liquid solvent. The liquid solvent may be any liquid in which the polymer and crosslinking agent can be dissolved, mixed, suspended or otherwise dispersed to facilitate gel formation. The solvent is preferably an aqueous liquid such as distilled water, fresh water or a brine. Other preferred conditions for the gel precursor solution include a copolymer molecular weight within a range of about 0.2 million to 10 million, a copolymer concentration in a range of about 0.1% to 5% by weight, and a solution pH between about 3 and 6.

The solution is prepared by admixing the polymer, crosslinking agent, and solvent at the surface. Surface admixing broadly encompasses inter alia mixing of the solution components in bulk at the surface prior to injection or simultaneously mixing the components at or near the wellhead by in-line mixing means while injecting them. The volume of solution required is a function of the characteristics of the treatment zone, the adjoining formation and the fluids contained therein and is readily determinable by one of ordinary skill in the art. Such solutions typically have an initial storage modulus (G') of less than about 2 dynes/cm².

The solution is injected into a wellbore penetrating the formation as a homogeneous composition and is preferably injected as a single continuous slug. Generally the solution will selectively enter the higher-permeability zone wherein treatment is desired because of the inherent permeability gradient within a formation having zones of higher and lower permeability juxtaposed therein. Other conventional means may, however, also be applied to facilitate placement of the solution in the higher-permeability zone, such as mechanical packers or displacement fluids injected behind the gel precursor solution.

Substantial crosslinking of the solution does not occur until a substantial number of carboxylate groups are formed in situ on the polymer by hydrolysis of the first monomer. Typically the hydrolysis reaction is extremely slow at ambient atmospheric temperature so that appreciable amounts of carboxylate groups and subsequent crosslinks do not form upon preparation of the solution and prior to injection thereof. Substantial hydrolysis of the first monomer occurs when the solution is placed in the treatment zone and is elevated to the temperature of the formation. Once the carboxylate groups form on the first monomer, the crosslinking agent reacts relatively rapidly with these groups to form crosslinks at the carboxylate sites to effect gelation of the solution. The resulting gel typically has a storage modulus (G') of greater than about 15 dynes/cm².

The gelation rate is primarily dependent on the in situ hydrolysis reaction rate of the first monomer. The first monomer is accordingly selected to have a relatively rapid, yet controlled, hydrolysis rate in comparison to the hydrolysis rate of the second monomer which has a relatively slow or nonexistent hydrolysis rate within the temperature range of the present invention. This property enables significant formation of carboxylate crosslinking sites only after a delay time has elapsed which is sufficient to allow placement of the solution in the higher-permeability zone. A delay time between 2 and 24 hours, and preferably 4 and 8 hours is targeted.

The present process is particularly applicable to the treatment of formations which have a temperature less than about 90° C., preferably less than about 80° C., and most preferably between about 60° C. and about 80° C. Within the preferred temperature range, gelation of conventional polymers such as polyacrylamide which relies on an amide hydrolysis/carboxylate crosslinking mechanism is difficult to control because gel precursor solutions containing the polymers gel too slow for practical utility. Accordingly, the present invention recognizes that by synthesizing a copolymer or terpolymer formed from a monomer of a conventional oil field polymer and further including a first monomer having a faster hydrolysis rate than the conventional monomer, the polymer of the present invention is obtained having the desired properties for controlled in situ gelation.

The following examples provide further details with respect to preferred embodiments of the present invention set forth above, but as such are not intended to limit the scope of the invention.

EXAMPLE 1

An aqueous gel precursor solution is prepared by adding 0.259 cc of a 50% by weight chromic acetate solution to 65.7 g of a copolymer solution comprising acrylamide and ethoxy, ethoxy, ethyl acrylate at a molar ratio of 93:7. The copolymer concentration in the resulting precursor solution is 2% by weight. The pH of the solution is adjusted from 3.5 to 4.4 by adding 0.14 cc of a 10% sodium hydroxide solution. Thereafter, the temperature is raised from ambient room temperature (22° C.) to 60° C. and the storage modulus (G') of the precursor solution is measured as a function of time. G' is a quantitative representation of elasticity and is expressed in units of dyne/cm². The gelation results are shown graphically in FIG. 1.

EXAMPLE 2

An aqueous gel precursor solution is prepared in substantially the same manner as example 1 and maintained under substantially the same conditions. However, polyacrylamide is substituted for the copolymer of example 1. The gelation results are shown graphically in FIG. 2.

Figure 2:
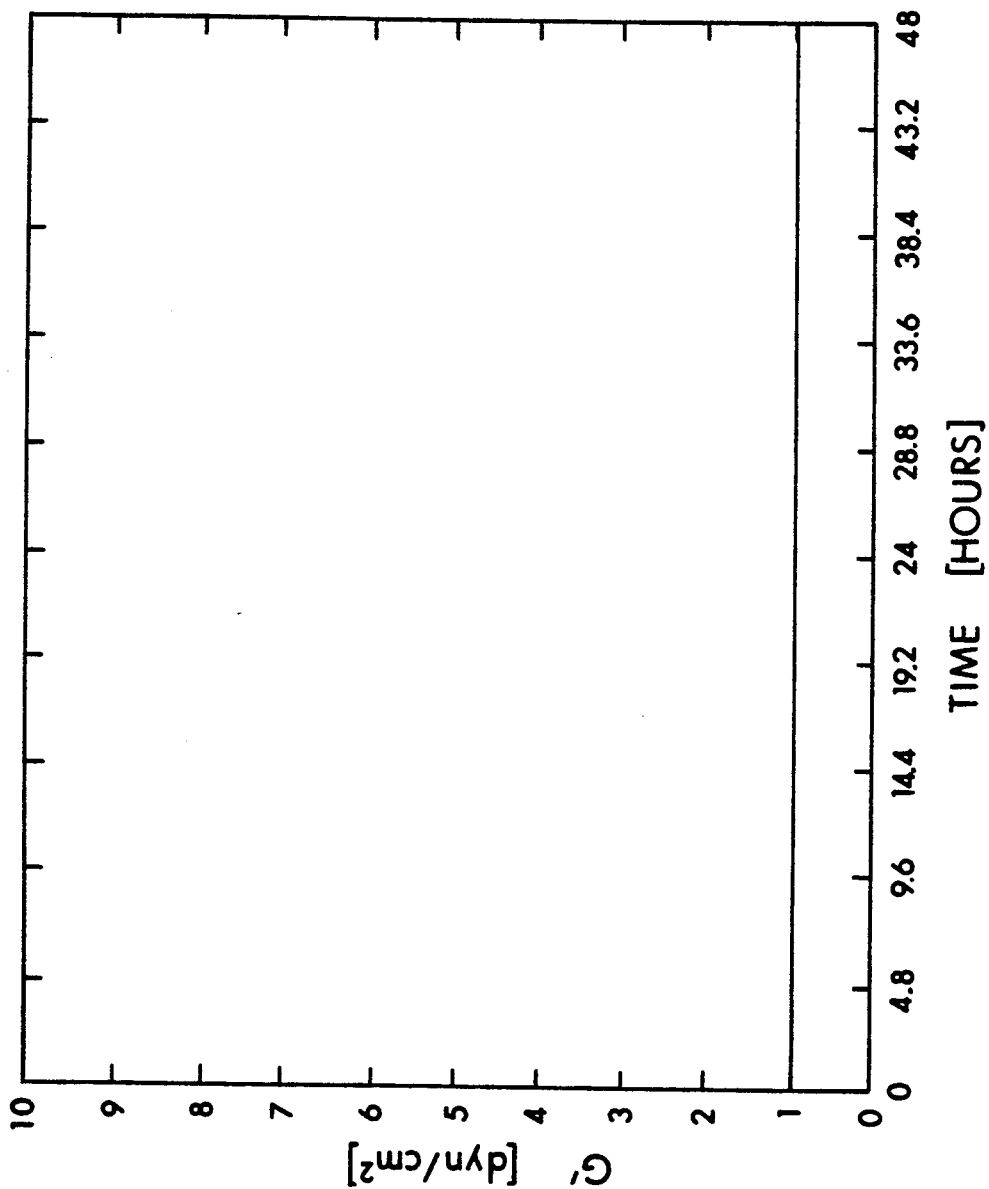
FIG. 2 is a graphical representation of a comparative gelation process as described in example 2.

A comparison of FIGS. 1 and 2 indicates that the process of the present invention represented by FIG. 1 achieves a gelation delay of about 20 hours after which time gelation occurs at a steady controlled rate. The gelation rate of the ester acrylamide copolymer parallels the ester acrylamide copolymer hydrolysis rate such that the copolymer is significantly hydrolyzed within 48 hours. FIG. 2, which represents a conventional gelation process of a polyacrylamide, does not show any significant hydrolysis and gelation of the polymer for the entire 48 hour duration of the experiment. It is further noted that increasing the ester concentration in the copolymer of example 1 would decrease the gelation delay time and increase the gel strength.

EXAMPLE 3

An aqueous gel precursor solution is prepared in substantially the same manner as example 1 and maintained under substantially the same conditions. However, the temperature of the precursor solution is raised from ambient room temperature (22° C.) to 80° C. rather than 60° C. The gelation results are shown graphically in FIG. 3.

EXAMPLE 4

An aqueous gel precursor solution is prepared in substantially the same manner as example 2 and maintained under substantially the same conditions. However, the temperature of the precursor solution is raised from ambient room temperature (22° C.) to 80° C. rather than 60° C. The gelation results are shown graphically in FIG. 4.

Figure 3:
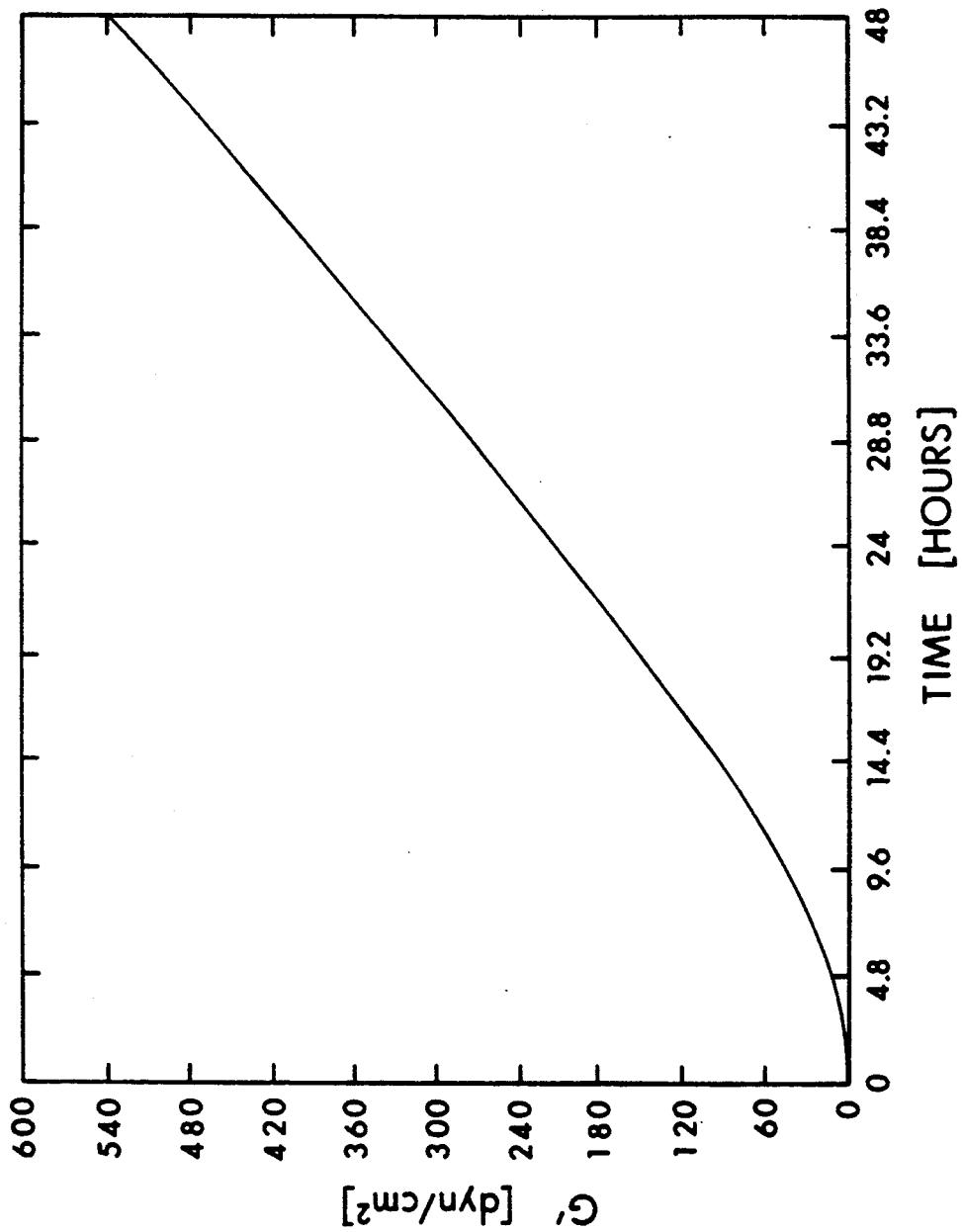
FIG. 3 is a graphical representation of the gelation process of the present invention as described in example 3.
Figure 4:
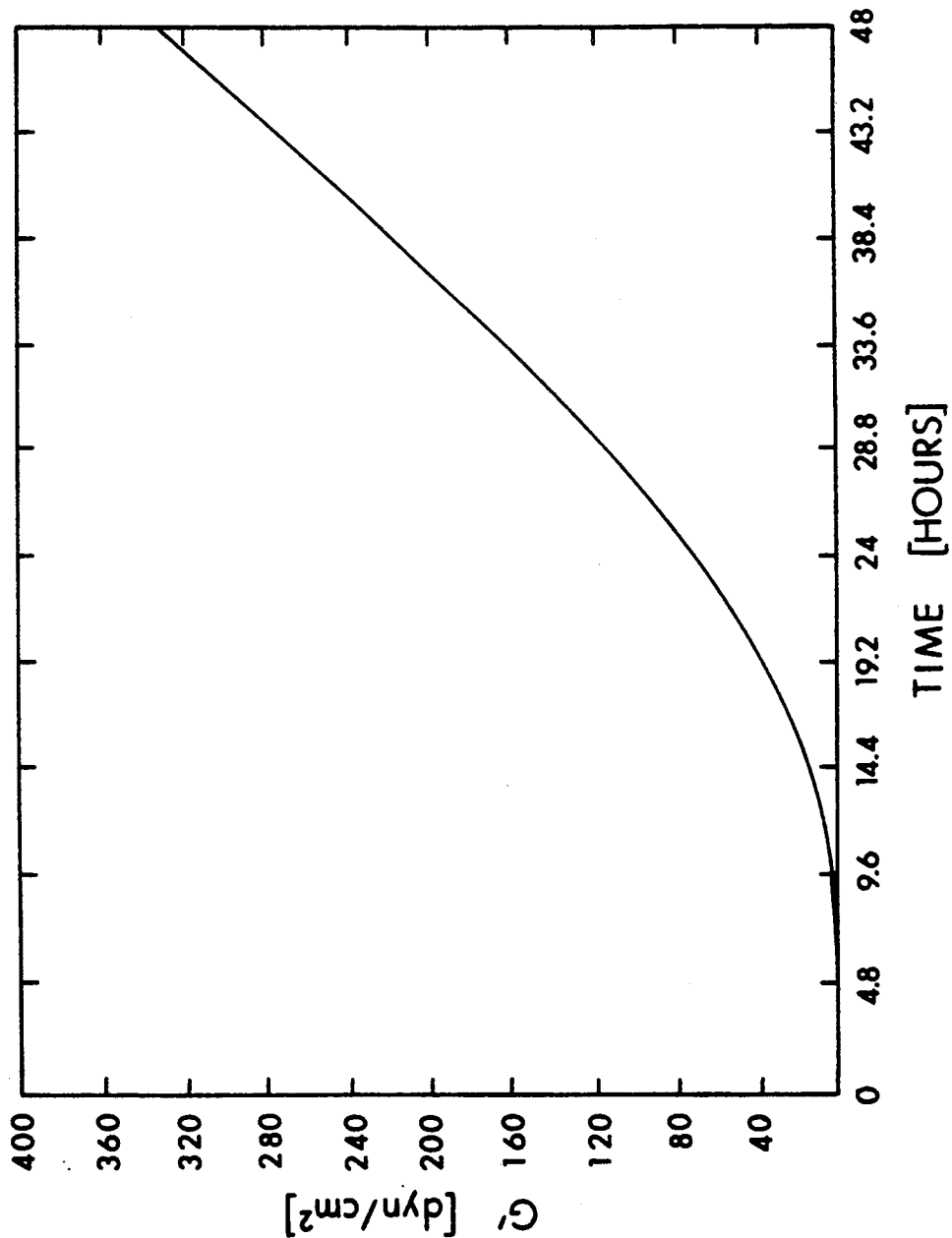
FIG. 4 is a graphical representation of a comparative gelation process as described in example 4.

A comparison of FIGS. 3 and 4 indicates that the reaction temperature is sufficiently high to hydrolyze both the ester acrylamide copolymer and the polyacrylamide of examples 3 and 4 respectively. However, the copolymer has a shorter delay time and produces a stronger gel within 48 hours than the polyacrylamide. Increasing the ester concentration in the copolymer of example 3 would enlarge the differences between the copolymer and polyacrylamide.

While certain preferred conditions, quantities and other parameters were detailed in the above description of preferred embodiments, those can be varied, where suitable, with similar results. Various applications, variations and ramifications of this invention will occur to those skilled in the art upon reading the present disclosure. Those are intended to be included within the scope of this invention as defined in the appended claims.

I claim:

1. A process for placement of a gel in a subterranean formation by gelling a gel precursor solution in situ comprising:
   providing said gel precursor solution comprising a polymer, a gelling agent, and a liquid solvent, wherein said polymer comprises a plurality of acrylamide monomers and a plurality of hydrolyzable ester monomers;
   injecting said solution into said subterranean formation;
   hydrolyzing at least some of said plurality of ester monomers to form a carboxylate group on each hydrolyzed ester monomer; and
   crosslinking a plurality of said carboxylate groups by means of said gelling agent to form said gel.

2. A process for placement of a gel in a subterranean formation as recited in claim 1 wherein the ratio of said ester monomers to said acrylamide monomers is between about 20:80 and 1:99.

3. A process for placement of a gel in a subterranean formation as recited in claim 1 wherein said ester monomer is water soluble and selected from a group consisting of short chain alkyl acrylates and ethoxy substituted alkyl acrylates.

4. A process for placement of a gel in a subterranean formation as recited in claim 1 wherein said gel precursor solution is provided by surface admixing of said polymer, gelling agent and liquid solvent.

5. A process for placement of a gel in a subterranean formation as recited in claim 1 wherein said crosslinking is substantially delayed for a time of about 2 to about 24 hours after injection of said solution into said formation.

6. A process for placement of a gel in a subterranean formation as recited in claim 1 wherein said formation has a temperature of less than about 80° C.

7. A process for placement of a gel in a subterranean formation as recited in claim 1 wherein said solution has an initial storage modulus value upon injection of less than about 2 dyne/cm$^2$ and said gel has a storage modulus value of greater than about 15 dyne/cm$^2$.

8. A process for placement of a gel in a subterranean formation as recited in claim 1 wherein said subterranean formation has a zone of relatively higher permeability and a zone of relatively lower permeability in fluid communication with said zone of relatively higher permeability and further wherein said solution is gelled in said zone of relatively higher permeability.

9. A process for placement of a gel in a subterranean formation as recited in claim 8 wherein said gel substantially reduces the permeability in at least a portion of said zone of relatively higher permeability.

10. A process for placement of a gel in a subterranean formation as recited in claim 8 wherein said zone of relatively lower permeability contains a hydrocarbon fluid.

11. A process for placement of a gel in a subterranean formation as recited in claim 8 further comprising injecting a hydrocarbon displacement fluid into said subterranean formation and diverting said hydrocarbon displacement fluid from said zone of relatively higher permeability to said zone of relatively lower permeability by means of said gel.

12. A process for placement of a gel in a subterranean formation as recited in claim 1 wherein said gelling agent is a crosslinking species containing a transition metal cation.

13. A process for placement of a gel in a subterranean formation as recited in claim 1 wherein said gelling agent is a crosslinking species containing a trivalent chromium cation.

14. A process for reducing the permeability of a relatively higher-permeability zone of a subterranean formation in fluid communication with a relatively lower-permeability zone of said formation by delayed in situ gelling of a gel precursor solution, said process comprising:
   providing said gel precursor solution comprising a polymer, a crosslinking agent, and a liquid solvent, wherein said polymer comprises a plurality of acrylamide monomers and a plurality of hydrolyzable ester monomers;
   placing said solution in said relatively higher permeability zone of said subterranean formation;
   maintaining said solution in said relatively higher permeability zone for a delay time while hydrolyzing at least some of said plurality of ester monomers to form a carboxylate group on each hydrolyzed ester monomer; and
   gelling said solution after said delay time by crosslinking a plurality of said carboxylate groups with said crosslinking agent to substantially decrease the permeability of said relatively higher-permeability zone.

15. A process for reducing the permeability of a relatively higher-permeability zone of a subterranean formation in fluid communication with a relatively lower-permeability zone of said formation by in situ gelling of a gel precursor solution, said process comprising:

providing said gel precursor solution comprising a polymer, a crosslinking agent, and a liquid solvent, wherein said polymer comprises a plurality of a first monomer and a plurality of a second monomer, and further wherein the hydrolysis rate of said first monomer is greater than the hydrolysis rate of said second monomer;

placing said solution in said relatively higher-permeability zone of said subterranean formation;

hydrolyzing at least some of said plurality of first monomers in said relatively higher-permeability zone to produce carboxylate crosslinking sites; and forming crosslinks between said carboxylate crosslinking sites by means of said crosslinking agent, thereby forming said gel in said zone of relatively higher permeability and substantially decreasing the permeability thereof.

16. A process for reducing the permeability of a relatively higher-permeability zone of a subterranean formation in fluid communication with a relatively lower-permeability zone of said formation as recited in claim 15 wherein said first monomer is a hydrolyzable ester and said second monomer is selected from a group consisting of acrylamide and N-substituted acrylamides.

17. A process for reducing the permeability of a relatively higher-permeability zone of a subterranean formation in fluid communication with a relatively lower-permeability zone of said formation as recited in claim 16 wherein said hydrolyzable ester is selected from a group consisting of short chain alkyl acrylates and ethoxy substituted alkyl acrylates.

18. A process for reducing the permeability of a relatively higher-permeability zone of a subterranean formation in fluid communication with a relatively lower-permeability zone of said formation as recited in claim 15 wherein said crosslinking agent is a species containing a trivalent chromium cation.

19. A process for reducing the permeability of a relatively higher-permeability zone of a subterranean formation in fluid communication with a relatively lower-permeability zone of said formation as recited in claim 15 wherein the temperature of said zone of relatively higher-permeability is less than about 80° C.

* * * * *